May 16, 1939.  M. KUESTERMEIER  2,158,757
COUPLING
Filed July 11, 1938
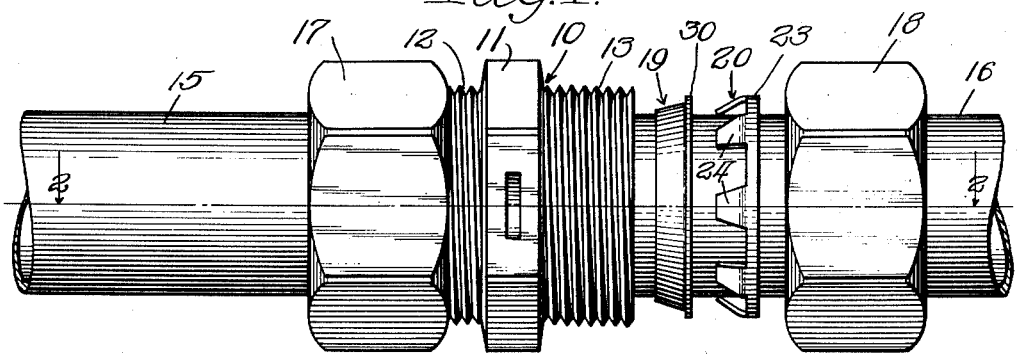
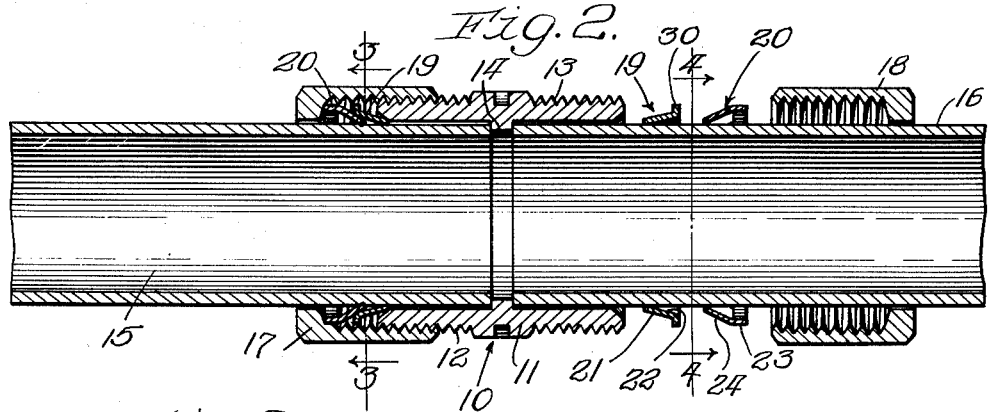
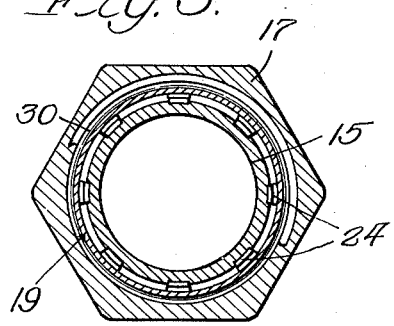
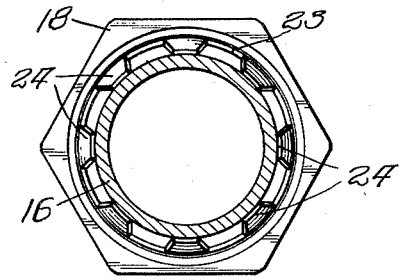
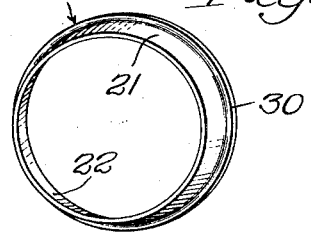
Inventor:
Max Kuestermeier, Patented May 16, 1939

2,158,757

UNITED STATES PATENT OFFICE 2,158,757

COUPLING

Max Kuestermeier, Chicago, Ill., assignor to William J. Katzberg

Application July 11, 1938, Serial No. 218,686

5 Claims. (Cl. 285—196)

This invention relates to a coupling, and more particularly to improved means for gripping and sealing the end of a tube.

One feature of this invention is that it provides improved means for coupling a tube, as a thin-walled electrical conduit tube, to another tube or to an outlet box or similar electrical device; another feature of this invention is that it requires no threading or other preparation of the tube; yet another feature is that improved gripping means is provided for frictionally locking the tube in place; a further feature of this invention is that improved and separate means is provided for making a fluid-tight seal between the coupling body and the tube; still another feature of this invention is that couplings embodying this invention may be used and reused; other features and advantages of this invention will be apparent from the following specification and the drawing, in which:

Figure 1 is a side elevation of a coupling embodying my invention, the parts on one side being separated for purposes of better illustration; Figure 2 is a sectional view along the line 2—2 of Figure 1; Figure 3 is a transverse sectional view along the line 3—3 of Figure 2; Figure 4 is a transverse view, partly in section, along the line 4—4 of Figure 2; and Figure 5 is a perspective view of a sealing ring.

Electrical wiring in buildings or the like sometimes employs flexible armored cable, but more frequently metal tubing or piping is used and insulated wires drawn therethrough. Such tubing is sometimes of heavy pipe, threaded at the ends to make the desired connection; but of recent years much of said work has employed thin-walled seamless drawn metal tubing of such character that it may be conveniently bent and formed to avoid the necessity of a number of angle couplings.

Tubing of any character, of course, requires coupling means for connecting the ends of the tubes to outlet boxes, switch boxes, or the like; and where the distances traversed between outlets are such that two or more lengths of pipe must be used, means for coupling the pipe together. The present invention provides an improved coupling including a socket adapted to receive an end of a tube, means for frictionally gripping the tube to lock it in the socket, and means for providing a fluid-tight seal. No threading or preparation of the end of the pipe is necessary, other than cutting it to the proper length, and filing off any burrs, or raw edges.

Trade usage is such that the word "coupling" is generally used to characterize a device for joining together two lengths of tube, and the word "connector" is used to indicate a device for joining a tube to an outlet box or the like. The present invention, however, is equally adaptable for either type of device; and while here illustrated in the form of a device for joining together two lengths of tube, it will be understood that the word "coupling" as hereinafter used is used in the generic sense and is intended to include any form of device having one or more means for engaging the end of a conduit tube. That is, "coupling" is intended to include the devices known technically in the trade as couplings and as connectors, and any other devices embodying the elements of the invention hereinafter claimed.

In the particular embodiment of this invention illustrated herewith a coupling is shown having a body member 10 of substantially cylindrical form, with a bore or opening extending therethrough. It is provided in the center with a polygonal portion 11 adapted to facilitate the drawing up of locking nuts, and is provided on each end with threaded portions 12 and 13 adapted to receive such nuts. The body member may have one or more inwardly stamped or bumped portions 14 forming an internal shoulder against which the ends of tubes 15 and 16 abut, the shoulder dividing the internal bore into two sockets. Nuts 17 and 18 are adapted to be drawn into threaded engagement with the body member about the two sockets, and to cooperate with means hereinafter more fully described to lock and seal the tubes in place in such sockets.

Inasmuch as the coupling illustrated is symmetrical at each end, the arrangement and parts being duplicated, the construction and operation of only one end will be described in detail.

Referring more particularly to the right hand end of Figure 2, the tube 16, which may be of 20-gage seamless drawn steel, is shown in place in the socket with its end abutting the shoulder or stop 14. It will be noted that the end of the socket portion of the body member of the coupling is slightly sloped; and that the nut 18 is provided with an internal annular shoulder lying closely adjacent the outer wall of the tube 16, this internal shoulder also having a slight slope.

Locking and sealing means is provided in combination with the parts heretofore described, here comprising a sealing ring 19 and a gripping ring 20. Both of these rings are adapted to encircle the tube, and to lie between the end of the socket portion of the coupling and the shoulder on the nut.

As may be best seen from Figures 2 and 5, the sealing ring is provided with an outer surface 21 and an inner surface 22, these surfaces being substantially parallel and both sloping with respect to the outer wall of the tube 16. The back or outer edge of the ring 19 is provided with an outwardly projecting annular flange 30 which reinforces it at this point.

The gripping ring 20 comprises an annular portion 23 spaced from the tube, and a plurality of identical finger portions 24 sloping inwardly and downwardly to terminate closely adjacent the outer wall of the tube.

Both of these rings may be of any convenient resilient or spring metal, but are here disclosed as of spring steel. By "spring" metal is meant a metal which yields under the pressures to which it is exposed without permanent deformation, returning to its original shape when the pressure is removed. Moreover, although they are described as having portions closely adjacent the tube, they actually can be so made as to be somewhat further spaced from the tube than other forms of locking and sealing means heretofore known, with the same gripping and sealing action. This is an advantage, since it permits greater tolerance in the diameters of the tubes, and the presence of slight burrs or other irregularities at the end of the tube does not prevent its being inserted into the socket through the rings.

The rings are preferably assembled with relation to each other, to the coupling, and to the tube, as illustrated. That is, the sealing ring 19 is placed next to the end of the socket portion of the coupling, with the slope toward the coupling; and the gripping ring 20 is placed immediately to the outside of such sealing ring, preferably with the fingers projecting therein. It will be noted that the inner surface 22 of the sealing ring 19 contacts the outer surface of the fingers 24 when the rings are forced toward each other, and thus forces such fingers inwardly into tight gripping engagement with the outer wall of the tube 16. The fact that the pressure developed all around the ring is exerted on the pipe or tube only at the ends of the fingers results in forcing such ends into such tight locking relation with the tube that a considerable force is required to remove it from the socket when the nut is tightly drawn up.

The coupling would normally be supplied to the user with the rings 19 and 20 in position at the end thereof and retained in place by the nut 18, loosely threaded on to the threaded portion 13 of the body member. The user would then determine the desired length of tube, cut a tube to such length, and insert the end through the opening in the nut, through the rings, and into the socket. It would then only be necessary to draw the nut up on to the body member with a wrench or similar tool. While both rings would contact the outer wall of the pipe when the nut is drawn up, the ring 20 is depended upon to lock the pipe in place, and the ring 19 to provide a fluid-tight seal. The inward force exerted by the internal shoulder of the nut 18, driving the outer surfaces of the fingers against the inner surface 22 of the sealing ring, not only drives the fingers down into gripping engagement with the pipe as the result of such interaction, but also drives the surface 21 into engagement with the end of the socket portion of the body member, the sloping contact forcing the inner edge into sealing engagement with the outer wall of the pipe 16. The locked position of the parts, with the nut drawn up, is illustrated in the left hand end of Figure 2.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

I claim:

1. A coupling of the character described, including: a body member having a socket portion adapted to receive the end of a tube, a portion of the end of said socket sloping with respect to said tube; a nut in threaded engagement with said body member about the socket, said nut having an internal shoulder adapted to lie closely adjacent said tube; and a pair of spring metal rings adapted to encircle said tube and lie between the end of said socket and the shoulder on said nut, one of said rings having finger portions adapted to grippingly engage said tube when said nut is drawn up on said coupling, the construction and arrangement being such that when the nut is drawn up the rings are forced inwardly toward the pipe by the coaction between the nut and beveled socket portion, the other being adapted to provide a fluid-tight seal between said tube and said coupling.

2. Apparatus of the character claimed in claim 1, wherein said rings overlap and the sealing ring has a sloping surface adapted to contact the end of said socket portion, and a second sloping surface substantially parallel to said first-mentioned surface, said second sloping surface being adapted to force said finger portions inwardly into engagement with said tube.

3. A coupling of the character described, including: a body member having a socket portion adapted to receive the end of a tube, said member having a shoulder at the outer end of said socket portion; a nut in threaded engagement with said body member about the socket, said nut having an internal shoulder adapted to lie closely adjacent said tube and spaced from said first mentioned shoulder, at least one of said shoulders having a portion sloping with respect to said tube; and a pair of spring metal rings adapted to encircle said tube and lie between said shoulders, one of said rings having finger portions adapted to be forced inwardly by a cooperating surface to grippingly engage said tube when said nut is drawn up on said coupling, the other being a sheet metal annulus with the principal portion thereof sloping with respect to said tube, the upper surface of said sloping portion being adapted to contact one of said shoulders to effect a fluid-tight seal between said tube and said coupling.

4. A coupling of the character described, including: a body member having a socket portion adapted to receive the end of a tube, said member having a shoulder at the outer end of said socket portion; a nut in threaded engagement with said body member about the socket, said nut having an internal shoulder adapted to lie closely adjacent said tube and spaced from said first mentioned shoulder; and a pair of spring metal rings adapted to encircle said tube and lie between said shoulders, one of said rings having finger portions adapted to grippingly engage said tube, the other being a sheet metal annulus with the principal portion thereof sloping with respect to said tube, each of said rings being adapted to have a portion in contact with one of said shoulders and a portion in contact with the other ring, whereby said finger portions are caused to lock said tube in said coupling and said sheet metal ring effects a fluid tight seal between said tube and said coupling when said nut is drawn up.

5. A coupling of the character described, including: a body member having a socket portion adapted to receive the end of a tube, said member having a shoulder at the outer end of said socket portion; a nut in threaded engagement with said body member about the socket, said nut having an internal shoulder adapted to lie closely adjacent said tube and spaced from said first mentioned shoulder; means for grippingly locking said tube in said socket when said nut is drawn up; and a ring adapted to encircle said tube and provide a fluid-tight seal between said tube and said coupling, said ring being an unbroken annulus of spring sheet metal with the principal portion thereof sloping with respect to said tube, said ring being adapted to have the upper surface thereof contact one of said shoulders and to have pressure applied thereto urging it against said shoulder when said nut is drawn up, said pressure being applied thereto at a point further removed from said tube than the point of contact with said shoulder.

MAX KUESTERMEIER.